(12) United States Patent
Arimilli et al.

(10) Patent No.: US 7,996,564 B2
(45) Date of Patent: Aug. 9, 2011

(54) REMOTE ASYNCHRONOUS DATA MOVER

(75) Inventors: Lakshminarayana B. Arimilli, Austin, TX (US); Ravi K. Arimilli, Austin, TX (US); Ronald N. Kalla, Round Rock, TX (US); Ramakrishnan Rajamony, Austin, TX (US); Balaram Sinharoy, Poughkeepsie, NY (US); William E. Speight, Austin, TX (US); William J. Starke, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 27 days.

(21) Appl. No.: 12/425,093

(22) Filed: Apr. 16, 2009

(65) Prior Publication Data

US 2010/0268788 A1    Oct. 21, 2010

(51) Int. Cl.
*G06F 12/00* (2006.01)
(52) U.S. Cl. ......... 709/245; 709/213; 711/203; 711/202
(58) Field of Classification Search ................... 709/245, 709/213; 718/1, 100, 101, 102, 107; 711/200, 711/202, 203; 712/28
See application file for complete search history.

(56) References Cited

U.S. PATENT DOCUMENTS

| 6,928,529 | B2 * | 8/2005 | Shinomiya | 711/203 |
| 7,370,137 | B2 * | 5/2008 | Regnier | 711/6 |
| 2003/0033431 | A1 * | 2/2003 | Shinomiya | 709/245 |
| 2006/0277357 | A1 * | 12/2006 | Regnier | 711/6 |
| 2009/0198897 | A1 * | 8/2009 | Arimilli et al. | 711/122 |
| 2009/0198935 | A1 * | 8/2009 | Arimilli et al. | 711/165 |
| 2009/0198975 | A1 * | 8/2009 | Arimilli et al. | 712/225 |

* cited by examiner

*Primary Examiner* — Kenneth R Coulter
(74) *Attorney, Agent, or Firm* — Dillon & Yudell LLP

(57) ABSTRACT

A distributed data processing system executes multiple tasks within a parallel job, including a first local task on a local node and at least one task executing on a remote node, with a remote memory having real address (RA) locations mapped to one or more of the source effective addresses (EA) and destination EA of a data move operation initiated by a task executing on the local node. On initiation of the data move operation, remote asynchronous data move (RADM) logic identifies that the operation moves data to/from a first EA that is memory mapped to an RA of the remote memory. The local processor/RADM logic initiates a RADM operation that moves a copy of the data directly from/to the first remote memory by completing the RADM operation using the network interface cards (NICs) of the source and destination processing nodes, determined by accessing a data center for the node IDs of remote memory.

20 Claims, 6 Drawing Sheets

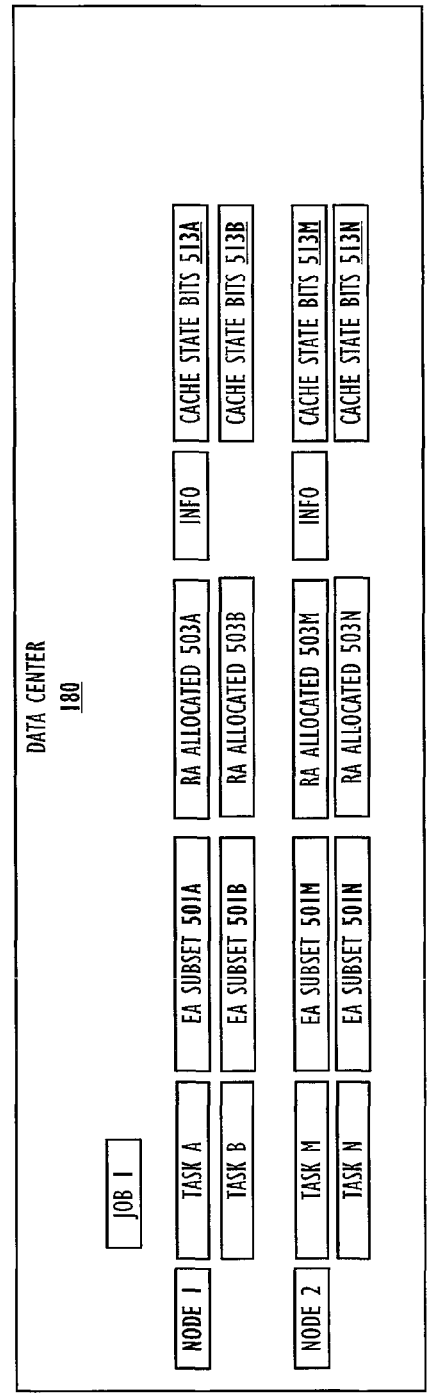

REMOTE ASYNCHRONOUS DATA MOVER

GOVERNMENT RIGHTS

This invention was made with Government support under DARPA, HR0011-07-9-002. THE GOVERNMENT HAS CERTAIN RIGHTS IN THIS INVENTION.

BACKGROUND OF THE INVENTION

1. Technical Field

The present invention relates generally to data processing systems and in particular to data operations within data processing systems. Still more particularly, the present invention relates to operations that move memory data during processing on a data processing system.

2. Description of the Related Art

Standard operation of data processing systems requires access to and movement and/or manipulation of data by the processing components. Application data are typically stored in memory and are read/retrieved, manipulated, and stored/written from one memory location to another. Also, the processor may also perform a simple move (relocation) of data using a series of load and store commands issued by the processor when executing the application code.

With conventional data move operations, the processor triggers the operating system to transfer data from one memory location having a first physical (real) address to another location with a different physical (real) address. Completing the data move operation typically involves a number of steps, including: (1) the processor issues a particular sequence of load and store instructions, which result: (a) a TLB performs an address translation to translate the effective addresses of the processor issued operation into corresponding real address associated with the real/physical memory: and (b) a memory or cache controller performing a cache line read or memory read of the data; (2) the TLB passes the real address of the processor store instruction to the memory controller (via a switch/interconnect when the controller is off-chip); (3) the memory controller acquires a lock on the destination memory location (identified with a real address) to prevent overwrite of the data during the data move operation; (4) the memory controller assigns the lock to the processor; (5) the processor receives the data from the source memory location (identified with a real address); (6) the processor sends the data to the memory controller; (7) the memory controller writes the data to the destination location; (8) the memory controller releases the lock on the destination memory location; and (9) a SYNC completes on the system fabric to inform the processor that the data move has finally completed and ensure that the memory subsystem retains the data coherency exists among the various processing units.

Inherent in the above process are several built-in latencies, which force the processor to wait until the end of most of the above processes before the processor may resume processing subsequently received instructions. Examples of these built in latencies include: (a) the TLB having to convert the effective address (EA) of the operation to the corresponding real address via the TLB or ERAT to determine which physical memory location that EA is pinned to; (b) the memory controller retrieving the data from the source memory location, directing the sourced data to the processor chip and then forwarding the data from the processor chip to the destination memory location; and (c) and lock acquisition process.

Generally, data operations are first completed at the user-level and then at the operating system (OS) level. For example, actual movement and modification of physical data within the distributed memory is provided for at the operating system level with real addresses corresponding to the real address space (of distributed memory) at which the data physically resides. However, similar operations are first provided for at the application or user level (via application code executing on the processor node) with virtual addresses (or effective addresses) utilized by the processor within a representative virtual address space. At the OS level, the actual movement (copying) of physical data is performed by one or more mechanisms associated with the interconnect.

In distributed data processing systems, in which a single job may have multiple tasks spread among multiple different nodes, each node may support a separate memory with separate mapping of a subset of effective addresses to real address space for that task/node. With these distributed systems, a call to move data is passed to the OS, which initiates a series of time-intensive and processor-intensive processes to determine the physical location of the real addresses to complete the data move. OS-level processing in a distributed system having multiple processing nodes requires a large number of operations at the node interconnect (or switch), and thus the data move incurs substantially large latencies.

Additionally, in most conventional systems, a large portion of the latency in performing data operations, such as with memory moves, involves the actual movement of the data from the first real address location (the source location) to the second real address location (the destination location). During such movement, the data is pinned to a specific real address to prevent the occurrence of a manage exception. The processor has to wait on completion of the address translation by the TLB and acquisition of the lock before proceeding with completing the operation and subsequent operations. Developers are continually seeking ways to improve the speed (reduce the latency) of such memory access data operations.

SUMMARY OF THE INVENTION

Generally, the embodiments illustrated and described herein provide a method implemented within a distributed data processing system, which executes multiple tasks within a parallel job, including a first local task on a local node and at least one task executing on a remote node, with a remote memory having real address (RA) locations mapped to one or more of the source effective addresses (EA) and destination EA of a data move operation initiated by a task executing on the local node. On initiation of the data move operation, remote asynchronous data move (RADM) logic identifies that the operation moves data to/from a first EA that is memory mapped to an RA of the remote memory. The local processor/RADM logic initiates a RADM operation that moves a copy of the data directly from/to the first remote memory by completing the RADM operation using the network interface cards (NICs) of the source and destination processing nodes, determined by accessing a data center for the node IDs of remote memory.

The RADM operation is performed by: (a) retrieving from a global resource manager (GRM) identifying information indicating which remote processing node among multiple remote processing nodes has the first remote memory in which the EA of the RADM instruction is mapped to a RA; (b) completing a user-level virtual move of data at the at least one processor by utilizing a source EA and a destination EA within the RADM instruction; and (c) triggering a completion of a physical move of the data at the first remote memory utilizing network interface controllers of the first remote processing node and a second node involved with the RADM operation, wherein the first remote node and second node are identified by respective node IDs (NIDs) retrieved from the GRM, and wherein a physical move of the copy of the data occurs concurrent with other ongoing processing on the at least one processor.

The above as well as additional objectives, features, and advantages of the present invention will become apparent in the following detailed written description.

BRIEF DESCRIPTION OF THE DRAWINGS

The novel features believed characteristic of the illustrative embodiments are set forth in the appended claims. These embodiments, however, will best be understood by reference to the following detailed description of illustrative embodiments when read in conjunction with the accompanying drawings, wherein:

FIG. 4 is a block diagram representation of an example RADM instruction provided by the asynchronous data mover to the network interface controllers (NICs) or host fabric interfaces (HFIs) of nodes associated with the data move operation, according to the described embodiments;

FIG. 5 is a block diagram representation of an example data center with node identification, node-level EA-to-RA mapping and other information utilized during RADM operations, according to one embodiment.

DETAILED DESCRIPTION OF ILLUSTRATIVE EMBODIMENTS

A. Overview

Figure 1:
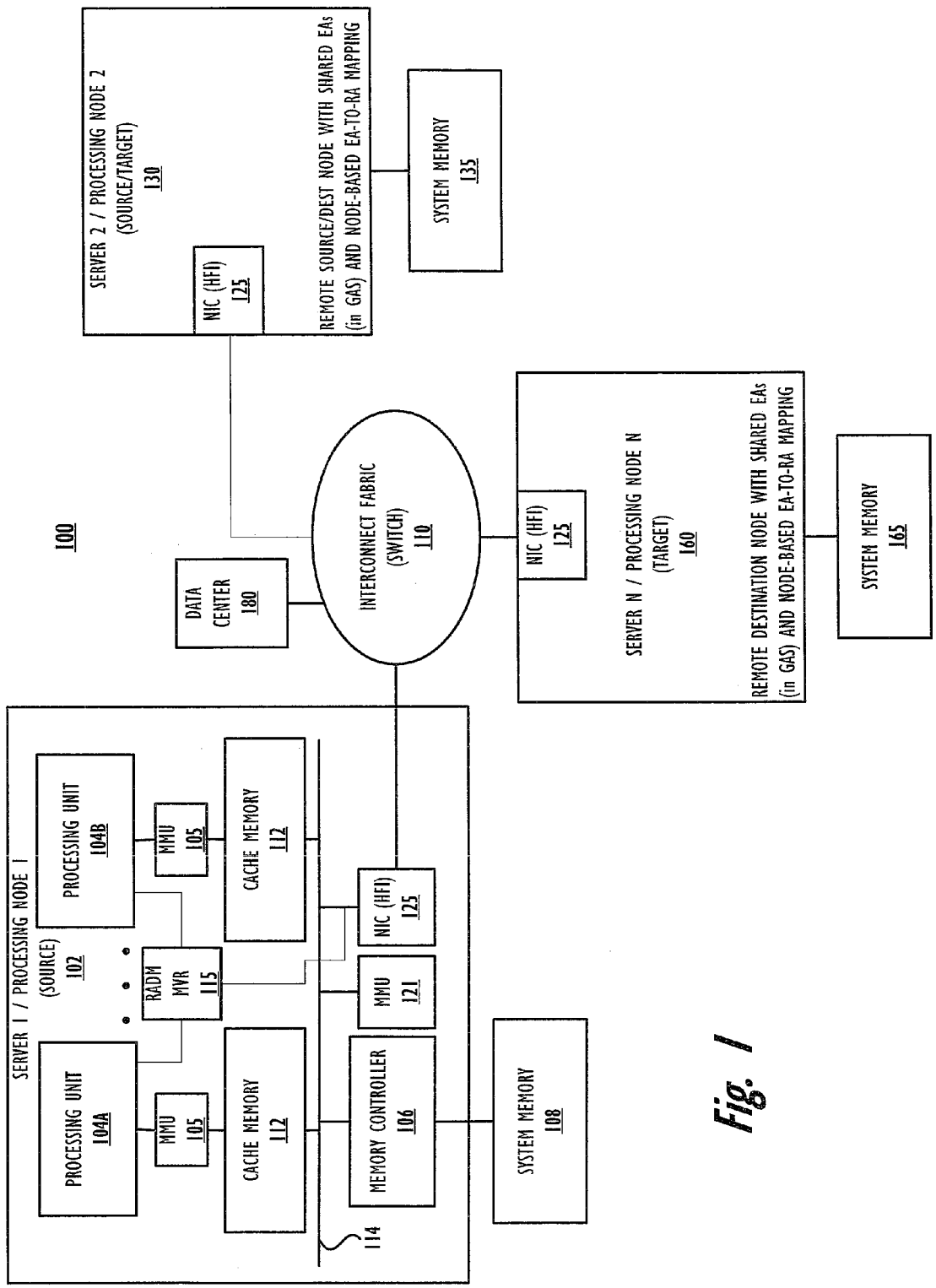
FIG. 1 is block diagram illustrating a distributed data processing system having at least two processing nodes and associated distributed memory, within which a processor/task may initiate a remote asynchronous data move (RADM) operation, according to one embodiment.

Generally, the embodiments illustrated and described herein provide a method implemented within a distributed data processing system, which executes multiple tasks within a parallel job, including a first local task on a local node and at least one task executing on a remote node, with a remote memory having real address (RA) locations mapped to one or more of the source effective addresses (EA) and destination EA of a data move operation initiated by a task executing on the local node. On initiation of the data move operation, remote asynchronous data move (RADM) logic identifies that the operation moves data to/from a first EA that is memory mapped to an RA of the remote memory. The local processor/RADM logic initiates a RADM operation that moves a copy of the data directly from/to the first remote memory by completing the RADM operation using the network interface cards (NICs) of the source and destination processing nodes, determined by accessing a data center for the node IDs of remote memory.

The RADM operation is performed by: (a) retrieving from a global resource manager (GRM) identifying information indicating which remote processing node among multiple remote processing nodes has the first remote memory in which the EA of the RADM instruction is mapped to a RA; (b) completing a user-level virtual move of data at the at least one processor by utilizing a source EA and a destination EA within the RADM instruction; and (c) triggering a completion of a physical move of the data at the first remote memory utilizing network interface controllers of the first remote processing node and a second node involved with the RADM operation, wherein the first remote node and second node are identified by respective node IDs (NIDs) retrieved from the GRM, and wherein a physical move of the copy of the data occurs concurrent with other ongoing processing on the at least one processor.

Further, The embodiments provide a data processing system and method, which enable remote management of an asynchronous movement of data from a first physical memory location of a first processing node (source) to a second physical memory location of a second processing node (destination), with the processor performing only an effective address (processor level) move of the data and without utilizing a substantial amount of operating system (OS) or interconnect resources.

As provide by one embodiment, a data processing system having at least one processor and a memory executes one or more tasks of a global job that has multiple tasks distributed across at least a first processing node and a second processing node, with different subsets of the effective address space mapped by a global resource manager to specific physical memory locations of the first and second processing nodes. When a first task executing on the processor encounters a data move requests (instruction), the data move instruction is passed to an asynchronous data mover. The asynchronous data mover accesses a shared data center to determine from and to which processing nodes the data move operation is to occur. The data center is accessible on/via the distributed network and stores the effective to real address allocations by processing node and/or by tasks assigned by the global resource manager. With this information known, the asynchronous data mover is able to complete the data move operation utilizing the network interface controllers (with all processing at the user level), without requiring OS level completion of the data move over the interconnect/switch. The processor completes other operations of the executing task (or thread) while asynchronous data mover handles the data move operation without tying up the OS and interconnect resources.

In one embodiment, a distributed data processing system includes: (1) a first node with a processor, a first memory, and an asynchronous data mover; (2) a second node having a second memory; (3) an interconnect that connects the first node and the second node; (4) a global resource manager that allocates tasks of a job across multiple processing nodes and which assigns subsets of the effective address space to specific real memory locations at different processing nodes; and (5) a data center in which the assignments of tasks to node and allocation of effective address space to real memory is recorded/stored. The processor includes processing logic for triggering the asynchronous data mover to initiate a data move operation across the processing nodes in response to the executing task encountering a data move operation in the execution thread. The asynchronous data mover receives the effective addresses from the data move instruction and retrieves the corresponding task and processing node information corresponding to the effective addresses. The asynchronous data mover than triggers the network interface controllers to complete the transfer/copy of data from the source node real address (or memory location) to the destination node real address (or memory location), without processor control or direct OS processing of the data move over the interconnect.

In one embodiment, the asynchronous data mover may be implemented via a specific software module (or set of instructions) executing on the processor to generate asynchronous data mover logic. In yet another embodiment, the asynchronous data mover utilizes architected registers or general purpose registers to track the effective and real addresses and corresponding processing nodes associated with the data move.

An asynchronous data mover (which may be hardware of software implemented) manages the actual movement of data within the real address space. The processor completes the movement of the data from the source effective address to the destination effective address in application/user space, and forwards the actual RADM instruction (i.e., the effective address and other relevant parameters) to architected registers accessible to the asynchronous data mover, to trigger the asynchronous data mover to manage completion of the actual copying of data to the destination node. The asynchronous data mover (hereinafter referred to RADM mover or RADM logic), completes the asynchronous data move operation (referred to hereinafter as an RADM operation) via utilization of a data center that is accessible over the interconnect (network) of the distributed data system.

Notably, the embodiments refer to the operations and the devices as "asynchronous" to highlight the processor continues processing other operations, received subsequent to the receipt and execution of the instruction to move data remotely, while the RADM mover manages the actual move of physical data across nodes within the real memory space. The RADM operation may thus proceed in parallel or concurrently with other processor operations and RADM operations as well.

One or more modifications and/or enhancements are made to the instruction set architecture (ISA) to enable the ISA to provide at least one new instruction that the processor executes to trigger completion of an RADM operation by the RADM mover. The RADM instruction set is illustrated by FIG. 4, which is described below.

In the following detailed description of exemplary embodiments, specific exemplary embodiments are described in sufficient detail to enable those skilled in the art to practice the various embodiments, and it is to be understood that other embodiments may be utilized and that logical, architectural, programmatic, mechanical, electrical, and other changes may be made without departing from the spirit or scope attributed to the embodiments. The following detailed description is, therefore, not to be taken in a limiting sense, and the scope of the embodiments is defined by the appended claims and their equivalents.

Within the descriptions of the figures, similar elements are provided similar names and reference numerals as those of the previous figure(s), except that suffixes may be added, when appropriate, to differentiate such elements. Where a later figure utilizes the element in a different context or with different functionality, the element is provided a different leading numeral representative of the figure number. The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. For example, as utilized herein, the term "data" should be given the broadest possible interpretation as referring to any content stored within a first memory location that may be moved to another memory location. Thus, data may include instructions, pseudo code, and the like, for example. Use of the terms first, second, and the like are not meant to imply a particular sequence or ordering of the components, but rather to distinguish among two different representations of similar components.

B. Hardware Features

Turning now to the figures, and in particular to FIG. 1, which illustrates an example distributed Data Processing System (DPS) within which the described embodiments are advantageously implemented. Distributed DPS 100 comprises a plurality of processing nodes of which processing node1 102, processing node 2 130 and processing node N 160 are illustrated. Processing node1 102, processing node 2 130 and processing node N 160 are interconnected via interconnect fabric/switch 110 via respective network interface controllers (NIC) 125. Each NIC may be configured as a host fabric interface (HFI) and provide HFI functionality related to global shared memory operations, as described within U.S. patent application Ser. No. 12/024,163, relevant content of which is incorporated herein by reference.

Generally, that disclosure provides a method and data processing system for generating and processing global shared memory (GSM) operations that complete parallel job execution of multiple tasks on different physical nodes with distributed physical memory that is accessible via a single, shared, global address space (GAS). Each physical node of the data processing system has a host fabric interface (HFI), which includes one or more HFI windows with each window assigned to at most one locally-executing task of the parallel job, although multiple windows may be assigned to a single task. The HFI includes processing logic for completing a plurality of operations that enable parallel job execution via the different tasks, each of which maps only a portion of the effective addresses (EAs) of the shared GAS to the local (real or physical) memory of that node. Each executing task within a node is assigned a window within the local HFI. The window ensures that issued GSM operations (of the local task) are correctly tagged with the job ID as well as the correct target node and window identification at which the operation is supported (i.e., the EA is memory mapped). The window also enables received GSM operations with valid EAs in the task to which the window is assigned to be processed when received from another task executing at another physical node, while preventing processing of received operations that do not provide a valid EA to local memory mapping. The details about the mechanism by which the address allocations within the GAS is completed across multiple nodes is not provided in any detail herein, as that is not the focus of the present invention.

Returning now to FIG. 1, interconnect fabric 110 supports data communication between processing nodes 102 in accordance with one or more interconnect and/or network protocols. Interconnect fabric 110 may be implemented, for example, utilizing one or more buses, switches and/or networks. Any one of multiple mechanisms may be utilized by the HFI 120 to communicate across the interconnect 110. For example, and without limitation, HFI 120 may communicate via a proprietary protocol or an industry standard protocol such as Infiniband, Ethernet, or IP (Internet Protocol).

As utilized herein, the term "processing node" (or simply node) is defined as the set of computing resources that form the domain of a coherent operating system (OS) image. For clarity, it should be understood that, depending on configuration, a single physical system may include multiple nodes. Also, the use of the variable "N" as the reference number of processing node N 160 indicates that distributed DPS 100 can include a variable number of separate processing nodes, with N being an integer of any size greater than 1. It is appreciated that the GSM functionality enables scaling to a much larger number of processing nodes within a single distributed data processing system. The number of processing nodes 102 deployed in a given system is implementation-dependent and can vary widely, for example, from a few nodes to many thousand nodes.

Each processing node may be implemented, for example, as a single integrated circuit chip (e.g., system-on-a-chip (SOC)), a multi-chip module (MCM), or circuit board, which contains one or more processing units 104 (e.g., processing units 104A, 104B) for processing instructions and data. Further, each processing unit 104 may concurrently execute one or more hardware threads of execution. Each processing node is also assumed to be a server (server 1, server 2, server N). Each processing node has associated therewith system memory 108, 135, 165 within which are multiple physical locations tagged with real addresses, as described in greater detail hereinafter.

Within the described embodiments, at least two different embodiments are provided for remote asynchronous data move operations. In the first embodiment, processing node 1 102 is the source node and processing node 2 130 is the destination/target node for data move operation that is initiated by a task executing on processing node 1 102. In the second embodiment, processing node 2 130 is the source node, while processing node N 160 is the destination/target node. With this embodiment, a task running on processing node 1 initiates the remote asynchronous data move from processing node 2 130 to processing node N 160.

Additional internal components of processing node 1 102 are illustrated and described herein and represent example components that may be found within any one of the processing nodes of distributed DPS 100. It should be understood, however, that the processing nodes are not necessarily symmetric in makeup and may be configured very differently from example processing node 1 102. Processing node 1 102 comprises multiple processing units, of which two processing units 104A, 104B (also known as and interchangeably referred to herein as central processing units (CPU)) are shown. Noted is the fact that, in some implementations, each separate processing unit within processing node 1 102 may be considered a separate processing node; However, for simplicity in describing the various embodiments, each processing node is assumed to be a separate physical device having its own separate memory component and connected to the other processing nodes via interconnect fabric 110.

In the configuration of FIG. 1, each processing unit 104 is supported by cache memory 112, which contains one or more levels of in-line or lookaside cache. As is known in the art, cache memories 112 provide processing units 104 with low latency access to instructions and data received from source (s) within the same processing node 102 and/or remote processing node(s) 130/160. The processing units 104 within each processing node 102 are coupled to a local interconnect 114, which may be implemented, for example, with one or more buses and/or switches. Local interconnect 114 is further coupled to NIC/HFI 125 to support data communication between processing nodes 102, 130/160.

As further illustrated in FIG. 1, processing nodes 102 typically include at least one memory controller 106, which may be coupled to local interconnect 114 to provide an interface to a respective physical system memory 108. In alternative embodiments of the invention, one or more memory controllers 106 can be coupled to interconnect fabric 110 or directly to a processing unit 104 rather than to local interconnect 114.

In addition to memory controller, each processing unit 104 also includes a memory management unit (MMU) 105 to translate effective addresses to real (or physical) addresses. These MMUs 105 perform EA-to-RA translations for tasks executing on processing nodes (e.g., node 102A) of data processing system 100. However, the invention also uses a separate MMU 121, which is coupled to the local interconnect 114. MMU 121 performs EA-to-RA translations for operations received from tasks operating on remote processing nodes (e.g., node 102B) of data processing system 100. In one implementation of processor configurations, MMU 121 may be integrated with NIC/HFI 125 so as to support EA-to-RA address translations required by NIC/HFI and/or tasks utilizing HFI to complete GSM operations.

The NIC/HFI 125 and functional components thereof, which are described below, enables the task(s) executing on processing units 104a/104b to generate operations to access the physical memory 135/165 of other nodes that are executing other tasks of the parallel job using EAs from a shared global address space (GAS) and a GSM. Likewise, NIC/HFI 125 enables access by the task(s) on initiating node 102A to access physical memory 135/165.

Those skilled in the art will appreciate that data processing system 100 of FIG. A can include many additional components, which are not illustrated herein, such as interconnect bridges, non-volatile storage, ports for connection to networks or attached devices, etc. Because such additional components are not necessary for an understanding of the present invention, they are not illustrated in FIG. 1 or discussed further herein. As will be explained in greater detail below, NIC 125 enables SMP 122 to connect to and communicate with other remote devices, such as remote destination node 130, via a network, such as the Internet (not shown). Remote destination node 130 may be similarly configured to DPS 100, but not necessarily so. More importantly, in one embodiment, remote destination node 130 shares a global address space (GAS) with DPS 100, such that both devices utilize a subset of the same set of effective addresses (EAs), some of which are mapped to local memory on each device. With this configuration of shared EAs, the processor may perform operations, which source data to or from the physical memory of the remote destination node 130.

DPS 100 includes data center 120, illustrated coupled to the network fabric. In the described embodiments, data center 120 is utilized along with RADM mover 115 to enable the remote asynchronous data move operations described herein.

Figure 2:
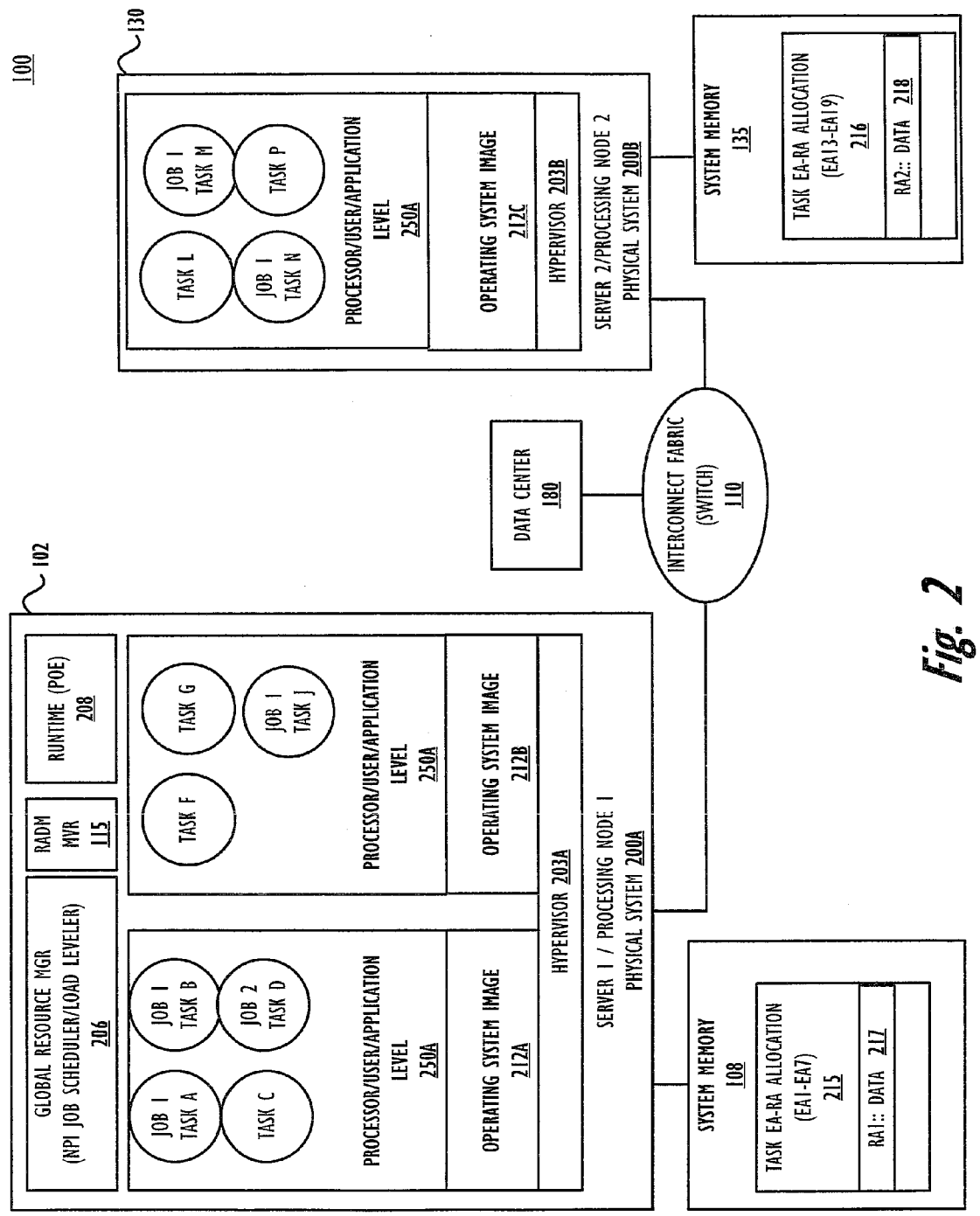
FIG. 2 is a block diagram representation of effective address to real address allocations by tasks and nodes, as provided by a global resource manager and stored within a network accessible data center, according to one embodiment.

The above described physical representations of nodes of the example distributed DPS 100 interconnected via NICs/HFIs 125 support the distribution of tasks associated with a parallel job across multiple nodes within a larger system with a GSM. FIG. 2 illustrates a high level view of software components that enable processing of multiple tasks of a parallel job within an exemplary software environment for DPS 100, in accordance with one embodiment. In the exemplary embodiment, DPS 100 includes at least two physically separate processing nodes 102 and 130/160 of FIG. 1) coupled by interconnect fabric 110. Each processing node contains an operating system image 212 which controls OS-level operations within that particular processing node. The OSes executing within each physical system 200 may be homogeneous or heterogeneous. Processing node 102 is depicted with two different OS images to indicate the implementation when a single physical device may provide multiple processing nodes. Notably, for simplicity, only one node of each physical system is utilized in the descriptions of the GSM and HFI functions herein, although the features of the invention are fully applicable to tasks executing on any one of multiple nodes on a single physical system accessing physical memory of other nodes on other physical system(s).

Each processing node 102, 130 may further include an instance of hypervisor 203 (also referred to as a Virtual Machine Monitor (VMM)). Hypervisor 203 is a program that manages the full virtualization or para-virtualization of the resources of physical system 200 and serves as an operating system supervisor. As such, hypervisor 203 governs the creation and destruction of nodes and the allocation of the resources of the physical system 200 between nodes.

Each node further provides a processor level 250 (also referred to as a user or application level) at which processes related to an application are executed by the processor, in what may be referred to as user space (to differentiate from the OS or hypervisor space). Different jobs and/or tasks are shown within processor level and these jobs/tasks provide threads of instructions/code that are executed by the processing units (104, FIG. 1). According to the illustrative embodiments, DPS 100 can execute a single job (e.g. Job 1) having multiple different tasks or types of tasks, which each execute at/on different ones of the processing nodes. As shown, processing node 1 102 executes Tasks A, B or Job 1, Task D of Job 2, and Task C, while processing node 2 130 executes Tasks M and N of Job 1, and Tasks L and P.

The allocation of tasks to specific processing nodes is performed by a global resource manager 206, which executes under operating systems 212 to facilitate the creation and execution of jobs. For example, FIG. 2 depicts a job management program (also referred to as a global resource manager—GRM) 206, such as LoadLeveler™, executing under operating system 212 and a runtime environment 208, such as Parallel Operating Environment™ (POE), also executing under operating system 212. LoadLeveler™ (206) and Parallel Operating Environment™ (208) are both commercially available products available from International Business Machines (IBM) Corporation of Armonk, N.Y.

Also illustrated by FIG. 2 are RADM Mover 115 and Data Center 180, both utilized to complete the remote asynchronous data move operations described herein. RADM Mover 115 may be implemented via software logic (ADM logic), with a particular sequence of code/instructions (or a unique ISA RADM instruction) triggering the execution of a remote data move operation, as described herein. Data Center 180 may be physically housed in a storage facility associated with any one of the processing nodes, including within system memory 108 for example.

FIG. 2 further illustrates internal effective address allocations within system memory 108, 135 of respective processing nodes 102, 130. Within the distributed environment of DPS 100, operating with the tasks assigned via the global resource manager, each node is assigned mapping for a specific subset of the EAs within the global address space. Thus, as shown, first example data blocks 215 within system memory 108 are allocated to EAs 1 through 7 (of the executing Job/task), while second example data blocks 216 of system memory 135 are allocated to example EA 13 through 19. Use of specific integer numbers to identify the EAs is solely to simplify the description of the allocation process and it is understood by those skilled in the art that the actual EAs are tagged with more complex alphanumeric tags. Also shown within system memory 108 is a first example data and corresponding real address (RA1) 217, representing the example source address and data for the remote data move described herein. Second data location tagged with RA2 218 within system memory 135 represents the destination/target memory location for the data move. RA1 and RA2 both correspond to (or translate to) respective EAs of the tasks assigned to the particular processing node.

The illustrated configuration of processors and memory subsystem (of caches and system memory) within data processing systems are presented herein for illustrative purposes only. The functional features of the embodiments described herein therefore apply to different configurations of data processing systems that (a) include some mechanism or logic for processing remote asynchronous data move (RADM) operations using EAs within an RADM operation and (b) provide a platform that supports the various functional features described herein.

In the following descriptions, headings or section labels are provided to separate functional descriptions of portions of the invention provided in specific sections. These headings are provided to enable better flow in the presentation of the illustrative embodiments, and are not meant to imply any limitation on the invention or with respect to any of the general functions described within a particular section. Material presented in any one section may be applicable to a next section and vice versa.

C. Remote Asynchronous Data Mover with Data Center

Figure 3:
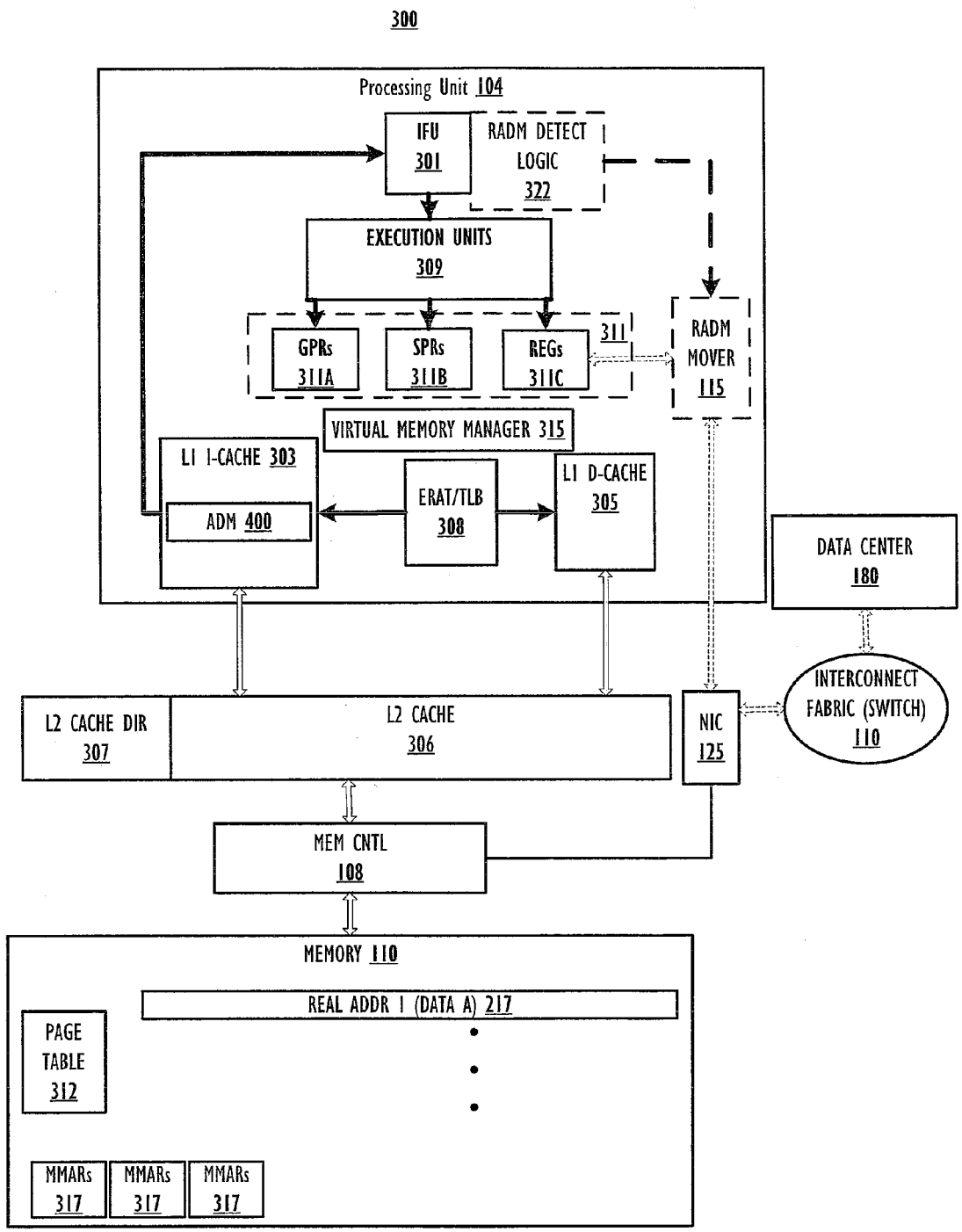
FIG. 3 is a block diagram illustrating an example configuration of components/logic within a data processing system utilized to perform a remote asynchronous data move operation, according to one embodiment.

FIG. 3 provides a more detailed illustration of the functional components within a processor and RADM Mover configuration of processing node 1 102. Configuration 300 provides a more detailed view of the connection between components of example processing unit 104 (FIG. 1) and connected memory subsystem and RADM Mover, which enables/triggers RADM operations. As shown, processing unit 104 includes instruction fetch unit (IFU) 301, or an instruction sequence. IFU 301 fetches instructions, such as RADM instruction 400 (described below with reference to FIG. 4), from L1 I-cache 203.

Processing unit 104 also comprises execution units 309 (not individually identified). Execution units perform operations on data based on the received instructions. In some operations, the execution units 309 also provide data to or utilize data from various processor registers 311, of which general purpose registers (GPRs) 311A, special purpose registers (SPRs) 311B and other registers 311C are shown.

As shown, configuration 300 provides RADM mover 115, utilized to perform several of the novel features described by the embodiments herein. In the described embodiments, RADM mover 115 may either be located within processing unit 104 or may be associated with or implemented by processing unit 104. RADM Mover couples to NIC 125 via an interconnect, such as system bus (not directly shown). Processing unit 104 includes RADM Detect logic 322, by which processing unit 104 detects RADM ST instructions within the instruction stream fetched by the IFU. RADM Detect Logic 322 retrieves the relevant address information and other information from a detected RADM instruction and forwards that information to RADM Mover 115. RADM Detect Logic 322 and RADM Mover 115 may be implemented via software instructions within the ISA. In one implementation, RADM Detect Logic 322 forwards the address and other information for the remote data move to RADM Mover 115 by placing the information within one or more of registers 311. Thus, in one embodiment in which RADM Mover 115 is off-chip, processing unit 104 communicates with the RADM mover 115 utilizing particular ones of the processor architected registers 311.

In addition to L1 I-cache 303, CPU 102 also includes a L1 D-cache 305, which together represents a bifurcated L1 instruction and data cache. The L1 caches 303, 305 couple to translation lookaside buffer (TLB) 308 (or Effective-to-Real Address translation table (ERAT)), and also couple to lower level, L2 cache 306. L2 cache 306 has an associated cache directory 307 for updating cache states and tracking addresses of cache lines and moved data. L2 cache 306 couples to system memory 110, perhaps indirectly through an L3 or even lower level cache.

System memory 110 contains a plurality of physical memory locations for storing data (and instructions), which locations are accessible via an associated real address. System memory 110 also contains page table 312, which memory controller 108 utilizes to find real address spaces within system memory 110. As provided, memory 110 also provides at least one real address spaces, namely, RA1 217, corresponding to a first physical (source) memory location within the described embodiments. Finally, according to one embodiment, system memory 110 may also include a plurality of memory-mapped architected registers (MMARs) 317, which the compiler or operating system allocates to the processor when the compiler binds the application to enable communication with the RADM Mover 115.

D. Instruction Set Architecture RADM Operations

In order to support remote asynchronous data moves, the instruction set architecture (ISA) of the Distributed DPS 100 (FIGS. 1, 2, 3) is modified to include a specialized RADM instruction and an RADM operation 400 (see FIG. 4). As described herein, the RADM instruction is a special instruction that is identified by the processing unit and which initiates an RADM operation. On receipt/detection of an RADM instruction within the instruction stream (of an executing thread) indicating the initiation of a remote data move operation, the processor (or RADM Detect Logic) forwards the effective addresses from within the RADM instruction to the RADM mover to initiate the RADM move. Once the processor receives an RADM instruction, the processor utilizes the EAs within the instruction to effect the data move operation in virtual space and provides the relevant EA and other information (e.g., number of bytes) to the RADM mover.

The use by the processor of effective addresses eliminates the requirement for an EA-to-RA translation to occur at the processor before the RADM Mover initiates the data move. Also, the data move no longer has to be pinned to a particular memory location and exceptions conditions are managed on the fly. The processor then continues to execute the instruction stream as thought the completion of the move in virtual space completes the actual move in physical memory. Thus, unlike conventional move operations, which the application triggers by providing a sequence of instructions that include a LD instruction, ST instruction and a SYNC to the OS level for completion, the described embodiments enables utilization of a single instruction to complete a memory move by enhancing the ISA to include support for a single RADM instruction.

When the EAs and other relevant information is received by the RADM Mover, the RADM Mover initiates a processing outside of the OS level processing to effect the move of data across nodes. The RADM Mover retrieves relevant information required for the data move from the Data Center and generates an RADM operation. FIG. 4 illustrates an example RADM operation with specific fields/entries included therein to effect a data move across two processing nodes in a distributed DPS. As shown, example RADM operation comprises the following fields: transaction ID (TID) 415; source (SRC) effective address (EA) 405; destination (DST) EA 407; count (CNT) 409, which provides the number of bytes (or size of data) being moved; and status/control 411. As their names imply, destination address entry and source address entry store the destination and source effective addresses, respectively of the remote asynchronous data move. These EAs correspond to real addresses (RAs) of the physical memory location from and to which the data are being physically moved. The CNT entry 409 of the RADM operation 400 provides the length of the data move operation (amount of bytes of data being moved). Further, the status/control entry 411 holds various types of status and/or control information for the AMM operation.

The RADM mover 115 receives the EAs from the RADM detect logic or registers (311) and accesses Data Center 180 to identify the corresponding node IDs and RAs to which the EAs are allocated. With this information retrieved from Data Center, the RADM Mover then fills in additional fields of RADM operation including: source node ID 417; Source real address 419; Destination Node ID 421; and destination real address 423. Actual inclusion of the various fields within a single RADM operation is not important to the completion of the data move operation, and is provided simply to illustrate that these values are retrieved by RADM Mover 115 from Data Center 180 prior to completing the data move operation.

FIG. 5 depict example entries within example Data Center 180. As provided herein, data center 180 is a database construct that is generated by the global resource manager during creation of a Job and allocation of tasks to processing nodes. As a component of that Job creation and task allocation, the global resource manager also maps a subset of the EAs utilized within the tasks/node to a physical memory location at that node. This that subset of EAs map to real addresses within the memory system of the node on which the task is executing. To track this allocation of tasks to node and the associated mapping of EAs to RAs at specific nodes, the global resource manager also creates/populates the data center with the task-to-node allocation and EA-to-RA mapping relationships. Thus, example data center 180 of FIG. 5 includes, associated with each job, an identification of the nodes and tasks assigned to each node. For each such assignment, Data center also provides EA subset 501, RA allocated to the EA subset 503, and other information concerning the allocations. In the illustrative embodiment, Data Center 180 also provides for each set of EAs-RAs cache state information 513, which may be utilized to trigger other coherency functions when a remote asynchronous data move operation modifies/replaces data within a node.

E. Compiler and/or Hardware Generation RADM Instruction

In one embodiment, a compiler or processor generates the AMM ST instruction from a particular sequence of instructions within an instruction stream. The ISA for the data processing system supports the RADM instructions. The compiler or processor monitors the instruction stream (during compilation or during execution of) the application. The compiler then generates an RADM instruction when the compiler detects a pre-defined sequence of instructions (common code loops) that together perform a memory move operation. An example instruction stream that triggers the compiler to generate an RADM ST instruction or which causes the processor to trigger the RADM Mover's initiation of an RADM operation includes the following:

LD ADDR1 (Task 1), GPR 14
ST ADDR2 (Task N), GPR 14
ADDi immediate, GPR 22
BNE 0, GPR 22 (branch not equal zero)

With the above code segment, Task 1 and Task N executed on separate remote nodes, and the compiler allocates the particular GPRs (e.g., GPRs 311A, FIG. 3) to perform data moves. These GPRs are accessible to the processor as well as to the RADM mover. With the processing unit implementation, the processing unit includes RADM detect logic that monitors the instruction stream to look for specific routines (common code loops) that together execute a remote asynchronous data move operation. When the RADM detect logic detects the particular code stream, the processor triggers the remote asynchronous data move operation via the RADM mover.

Notably, in one implementation, whenever the processor/ADM detect logic receives a first instruction in the above sequence of instructions, the processor/ADM detect logic buffers the instruction and subsequently received instructions to determine if the buffered instructions constitutes the full sequence that performs a remote asynchronous data move. Where the sequence does constitute an asynchronous memory move, and the data processing system supports such a move operation, to RADM detect logic places the effective addresses and other parameters in the corresponding (identified) GPRs. The RADM Mover then replaces the individual instructions with a single RADM operation. The processor performs the initial phases of the asynchronous memory move utilizing the effective addresses of the source node and destination node addresses.

F. Overlapping Processing During RADM Execution

In one embodiment, the processor enables parallel execution of the RADM operation along with other memory access operations. This embodiment enables the processor to complete other useful work in parallel with the memory move. The processor (or compiler during compilation of the application code) continually checks for effective address conflicts, and proceeds with execution until the compiler detects such a conflict.

In one embodiment, the ISA assigns a single bit within the CNTL bits of the RADM instruction to indicate when the CPU may perform the memory move asynchronously with other operations. The value of the asynchronous bit tells the CPU whether to execute other work in parallel (asynchronously) or in sequence (synchronously) relative to when the memory move operation is ongoing. An asynchronous setting allows for concurrent/parallel execution, while a synchronous setting prevents parallel execution.

Thus, for example, the thread that issued the RADM instruction continues processing the subsequently received instructions within that thread. The RADM operation proceeds in parallel with the other work being performed by the thread, in a fully asynchronous manner. For large data moves, the RADM may perform the single instruction in stages, while letting other tasks complete in parallel.

In one embodiment, the processor performs a pseudo-speculative processing, but does so with the AMM flag and status bits set to indicate the location of the move within the execution stream when the other instructions are executed. In another embodiment, the processor also utilizes the special architected registers to store state information that would enable the processor to restore back to the execution point preceding the overlapping execution.

According to one embodiment, the compiler of application code may detect that a data move operation involves a cross-node RADM operation, and the compiler generates an RADM instruction, which includes node identifying information (NodeIDs) for both the source processing node and target processing node. However, in another embodiment, the compiler simply adds some additional directional information in the status/control entry of the RADM instruction. Thus, for example, the compiler includes a target/destination node ID within the status entry. The status bits may indicate a particular destination memory or cache on the remote node. The RADM DL or processor forwards that information to the RADM mover. The RADM mover then accesses the Data Center and utilizes the node IDs to determine the remote node on which the source and destination memory location exists.

In one embodiment, the processor communicates with the RADM mover via one of two methods. In the first method, the compiler assigns several processor architected registers (i.e., registers similar to the GPRs and SPRs) to assist the CPU communicate relevant information (address parameters, control and status information) to the AMM mover. For example, the compiler may assign GPR14 and GPR22 (following from the above described sequence of load and store instructions that constitutes the example memory move operation). The embodiments in which processor architected registers are utilized includes those performed within server architectures.

In the second, alternate method, the compiler assigns specific locations in memory that are utilized by the CPU for communicating with the AMM mover. When the OS or compiler binds an application, the OS/compiler automatically allocates memory for performing the remote asynchronous move operation. These memory-mapped architected registers are identified to the RADM mover, which retrieves data from the registers to trigger performance of RADM operations. The use of memory mapped registers enables the processor and RADM mover to perform RADM operations with no changes required to the processor architected registers.

In one embodiment, the compiler defines the particular registers on a per-thread basis. Also, in one embodiment, described above, the compiler further allocates specific architected registers, similar to the GPRs and/or SPRs, to track the status of the RADM operation. Thus, one or more of the architected register in the processor core reports the status or result of an RADM operation to the CPU. The compiler may also allocate specific registers to allow the CPU to communicate a termination or interrupt request for the RADM operation. When (or if) the CPU executes a termination or an interrupt during processing of the RADM operation, the CPU (or RADM mover) restores the values of registers so that the registers appear as if the RADM operation never occurred. The CPU also communicates state information to the RADM mover via the architected registers for utilization when restoring the system from a failed or terminated RADM operation. The CPU adds the relevant state to each of the predefined registers, and the CPU utilizes the state for save and restore operations. In one embodiment, the compiler provides the architected states at the user level.

The embodiments further enable movement of bytes, cache lines and pages of data. The relative time the RADM mover performs/receives a move may also be tracked by the AMM mover to enable proper sequencing of data exchange among AMM operations and maintenance of the correct coherency of the memory subsystem.

G. Method for Performing RADM Operation

Figure 6A:
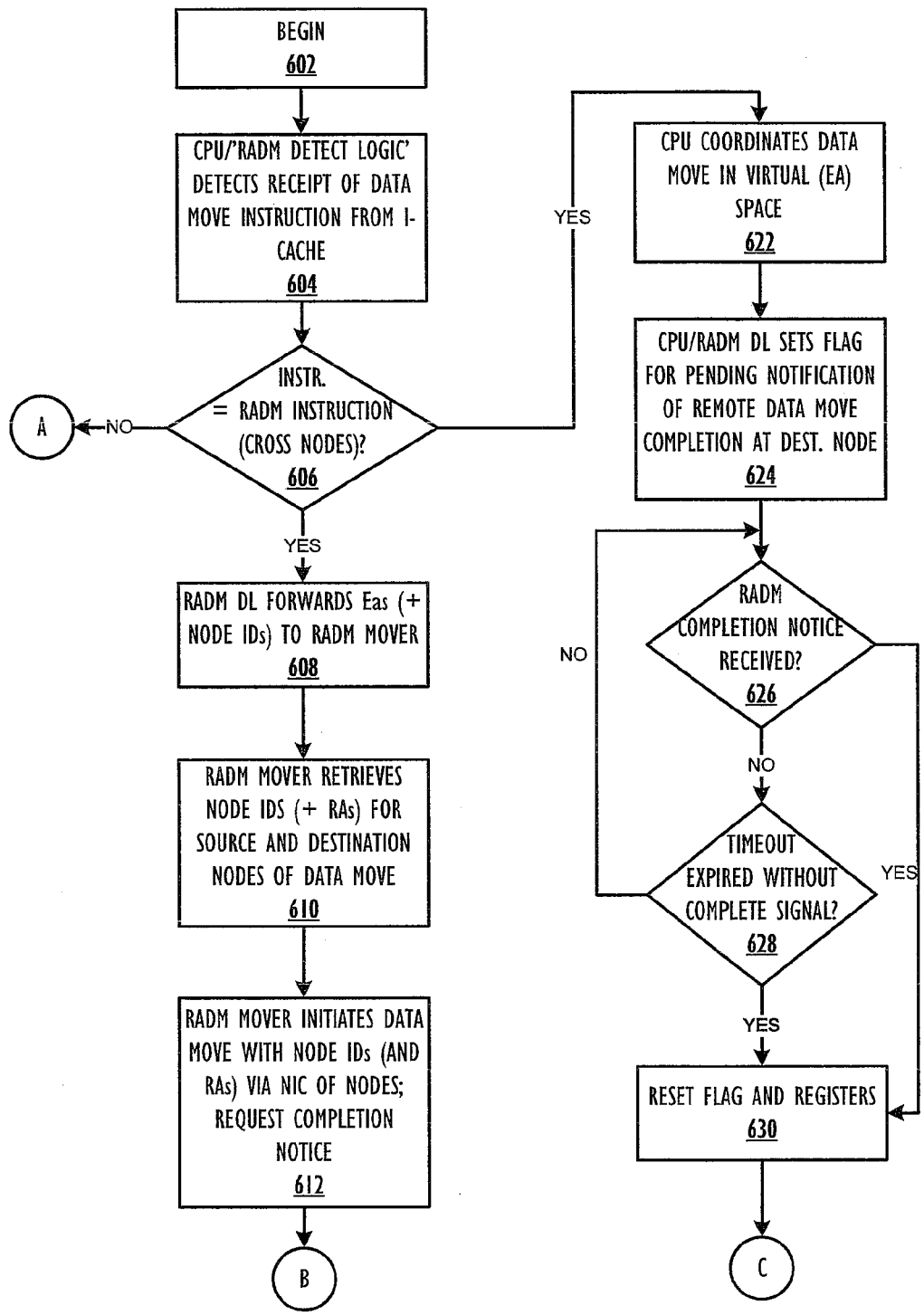
FIGS. 6A and 6B are subparts of a flow chart illustrating the method by which the remote asynchronous data move operation is performed as a direct node to node transfer of data utilizing the remote asynchronous data mover and network accessible data center, according to one embodiment.
Figure 6B:
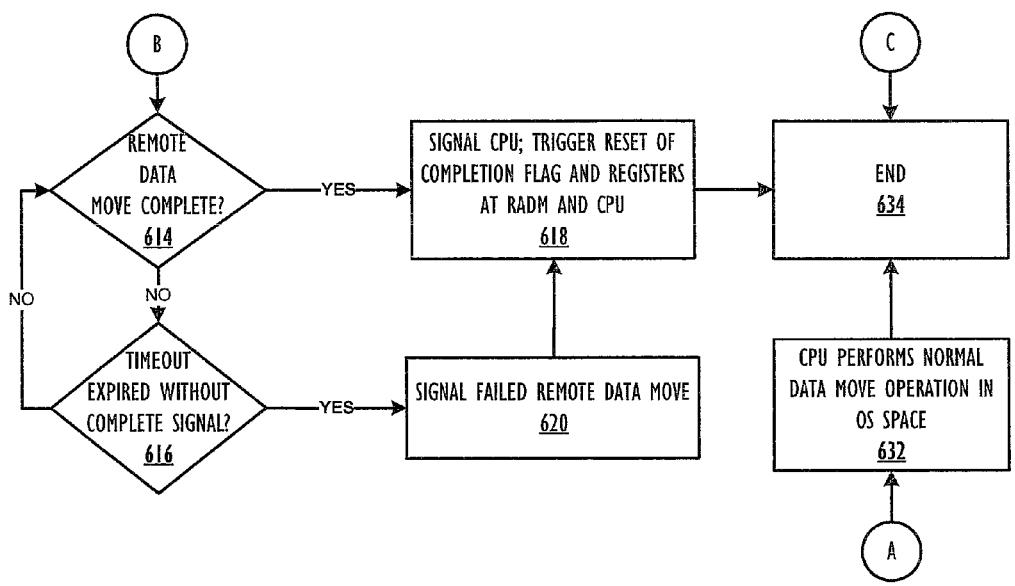

FIG. 6 is a flow chart illustrating one or more methods by which a remote asynchronous data move operation is completed within a distributed DPS, such as DPS 100. Various portions of the method(s) are performed by processing unit (e.g., processor, RADM detect logic, registers), while other portions are provided by RADM Mover, and the method(s) is/are generally described from the perspectives of one or both components operating separately, concurrently or in tandem, or as a single unit. The lower left most column of the method tracks operations/processes at the RADM Mover, while the right most column tracks operations/processes at the processor, for the most part.

The method of FIG. 6 begins at block 602 and proceeds to block 604 at which the CPU or RADM Detect Logic (DL) detects receipt of a data move instruction from the I-cache. The CPU and/or RADM DL determine at block 606 whether the instruction is an RADM instruction, which requires remote, asynchronous movement of data from a first processing node to a second processing node. In one embodiment, this process may actually involve the RADM DL accessing the Data Center to match the source and destination EAs within the received/detected data move instruction to the processing nodes with real addresses to which the EAs are respectively mapped. With this implementation, the retrieved node IDs are maintained by the RADM DL and/or forwarded to the RADM Mover for utilization when performing the actual data move operation. In another embodiment, the instruction itself includes an indication of whether or not the data move is across physical nodes. At block 606, when the instruction is not an RADM instruction, the CPU executes the instruction to perform the associated operation, as shown at block 632. When the instruction is determined to be an RADM instruction, the RADM DL passes the EAs from the instruction to RADM Mover 115 (FIG. 1, 2, 3), at block 608. The RADM Logic also passes the NodeIDs to the RADM Mover, if the NodeIDs were retrieved from the Data Center or included in the detected RADM instruction.

In one embodiment, when the instruction is a RADM instruction 400 (FIG. 4), the ADL DL retrieves the effective addresses (EAs) and count value from the instruction, stores the EAs and count value in respective registers. Concurrently or in parallel, the processor performs/coordinates the data move operation in virtual address space using the EAs, as shown at block 622. The ADL DL and/or processor also sets an RADM status flag within the processor and/or RADM Mover, to indicate that an physical RADM operation is in progress, as shown at block 624. The processor then waits for receipt of a completion notice for the data move, and the processor checks at block 626 whether the RADM completion notice is received. If the RADM completion notice is not received, the processor continues to periodically check for the receipt of the completion notice within a pre-established timeout period. At block 628, the processor checks the timeout status, and if the timeout is expired, the processor or RADM DL resets the flag and register values associated with the data move at block 630 to indicate a failure of the data move from completing.

While the data move is being performed within the effective address space, the processor or RADM DL triggers the RADM mover to complete the actual move of physical data from first memory of the first node (the source) to second memory of the second node (the destination), as provided at block 608. Specifically, the processor or RADM DL passes the EAs and other relevant information to the RADM mover. The RADM Mover then retrieves NodeIDs of the source node and destination node and RAs corresponding to the source and destination EAs from the Data Center, as shown at block 610. Access to the Data Center may be via a network connection or via a local connection. Then, at block 612, the RADM mover initiates the remote asynchronous data move in a series of background processes that does not involved the processor and/or the translation and other mechanisms within the OS.

The actual movement of data across nodes is controlled by the respective NICs of the source node and destination node. The use of the nodeID information and the specific EA subset allocation on specific nodes enables the remote asynchronous data move of physical data to be completed independent of any processor or OS involvement and while the processor continues to execute subsequent instructions within the thread's (or the tasks') instruction stream.

With the data move initiated, the RADM Mover waits (as provided at block 614) for receipt of an indication of the completion of the actual physical move. The RADM mover waits for the completion notification for the actual data move to the real address space and checks for the completion notification, as indicated at block 614 and waits until expiration of a preset timeout, as shown at block 616. If the completion notification is received y the RADM Mover, the RADM Mover signals the processor and triggers a rest of the completion flag, as provided at block 618. RADM Mover also resets the registers within the processor, as well as any registers utilized to perform the RADM operation. When no notification signal is received within a pre-established tie-out period, the RADM Mover signals failure of the data move operation, as shown at block 620. The RADM Mover then triggers a reset of the completion flag and registers, at block 618. The process ends at block 634 following a reset of the flags and registers. Thus, when the data move complete at the destination node, the NIC provides a signal/notification to RADM Mover, which responds to the receipt of the completion notification by resetting the flag to inform the processor of the completion and by resetting the registers (e.g., status/control, address and count registers).

In the flow chart described above, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

Generally, the embodiments described herein provide a method implemented within a data processing system having at least one processor which executes processes of a first task of multiple tasks within a parallel job, including at least one second task executing on a first remote processing node and a memory communicatively coupled to the at least one processor and having a plurality of physical storage locations having associated real addresses (RAs) for storing data, wherein one or more effective addresses of a process of the first task executing on the at least one processor is mapped to a RA of at least one physical storage location in a first remote memory of the first remote processing node. The method comprises: receiving at a remote asynchronous data mover (RADM Mover) associated with the at least one processor, information related to a remote asynchronous data move (RADM) instruction/request, which moves data to/from a first effective address (EA) that is memory mapped to a RA of a physical storage location in the remote memory; and initiate a remote asynchronous data move (RADM) operation that moves a copy of the data from/to the first remote memory. The RADM operation is performed by: (a) retrieving from a global resource manager (GRM) identifying information indicating which remote processing node among multiple remote processing nodes has the first remote memory in which the EA of the RADM instruction is mapped to a RA; (b) completing a user-level virtual move of data at the at least one processor by utilizing a source EA and a destination EA within the RADM instruction; and (c) triggering a completion of a physical move of the data at the first remote memory utilizing network interface controllers of the first remote processing node and a second node involved with the RADM operation, wherein the first remote node and second node are identified by respective node IDs (NIDs) retrieved from the GRM, and wherein a physical move of the copy of the data occurs concurrent with other ongoing processing on the at least one processor.

In one embodiment of the method, the second node is a local processing node, and the method further comprises: when the data is being moved from the first remote node to the local processing node, the NIC of the local processing node receiving the data from a remote NIC of the first remote node and places the data within a RA location of memory to which the destination EA of the RADM instruction is mapped, wherein the RADM operation moves a copy of data from the first remote node to the local processing node without direct processor or OS involvement at the local processing node. The method also comprises: when the data is being moved from the local processing node to the first remote node, the NIC of the local processing node retrieving the copy of the data directly from the RA mapped to the source EA of the RADM instruction and forwards the data towards a remote NIC of the first remote node, which remote NIC places the data within a RA location of first remote memory to which the destination EA of the RADM instruction is mapped, wherein the RADM operation moves a copy of data from the local processing node to the first remote node with little direct processor or OS involvement at the local processing node.

In yet another embodiment, the NIC is a host fabric interface (HFI). Also, in one implementation, both the first remote node and the second node are remotely connected, via a network fabric to a local processing node.

In other embodiments the method comprises: the RADM Mover accessing a data center to retrieve the identifying information during said retrieving, wherein the data center includes the identifying information about the node-level EA-to-RA mappings for a parallel job with multiple tasks executing across multiple processing nodes, wherein the data center maintains task-distribution and address mapping information generated during initialization of the parallel job by the GRM. Also, the method comprises recognizing the RADM instruction/request within an instruction set architecture, which RADM instructions initiate a remote asynchronous data move operation, said RADM instruction including a source effective address (EA) and a destination effective address for the RADM operation; and the processor retrieving the source EA and the destination EA from the RADM instruction and placing the addresses within one or more registers of the RADM Mover; wherein the asynchronous data mover includes one or more registers for holding the source effective address (EA) and the destination EA of the RADM operation.

Finally, the method provides wherein the RADM instruction comprises a set of fields, including a first field with the source EA, a second field with the destination EA, and a third field indicating a move operation to be performed on the data at the source EA. Here the method further comprises: the RADM Mover processing information from a received RADM instruction to provide a fourth field with node identifying information, indicating a physical or network location of one or more processing nodes with memory storage locations having RAs to which the source EA and destination EA are mapped; and the RADM Mover forwarding the information from the RADM instruction along with the fourth field to the network interface controller (NIC), which forwards an RADM operation request to NICs of a corresponding source processing node and a corresponding destination processing node for completion of the RADM operation.

Certain aspects of the described embodiments are also provided as processes performed by physical structures or logic within a data processing system. With these embodiment are provided a data processing system having a first processing node comprising: at least one processor which executes processes of a first task of multiple tasks within a parallel job, including at least one second task executing on a first remote processing node; a memory communicatively coupled to the at least one processor and having a plurality of physical storage locations having associated real addresses (RAs) for storing data; wherein one or more effective addresses of a process of the first task executing on the at least one processor is mapped to a RA of at least one physical storage location in a first remote memory of the first remote processing node; and a remote asynchronous data mover (RADM Mover) associated with the at least one processor and which, when triggered by processor execution of a remote asynchronous data move (RADM) instruction/request, which moves data to/from a first effective address (EA) that is memory mapped to a RA of a physical storage location in the remote memory, performs the set of method functions described above.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A data processing system having a first processing node comprising:
    at least one processor which executes processes of a first task of multiple tasks within a parallel job, including at least one second task executing on a first remote processing node;
    a memory communicatively coupled to the at least one processor and having a plurality of physical storage locations having associated real addresses (RAs) for storing data;
    wherein one or more effective addresses of a process of the first task executing on the at least one processor is mapped to a RA of at least one physical storage location in a first remote memory of the first remote processing node;
    a remote asynchronous data mover (RADM Mover) associated with the at least one processor and which, in response to being triggered by processor execution of a remote asynchronous data move (RADM) instruction/request, which moves data to/from a first effective address (EA) that is memory mapped to a RA of a physical storage location in the remote memory, performs the following function:
    initiate a remote asynchronous data move (RADM) operation that moves a copy of the data from/to the first remote memory by:
        (a) retrieving from a global resource manager (GRM) identifying information indicating which remote processing node among multiple remote processing nodes has the first remote memory in which the EA of the RADM instruction is mapped to a RA;
        (b) completing a user-level virtual move of data at the at least one processor by utilizing a source EA and a destination EA within the RADM instruction; and
        (c) triggering a completion of a physical move of the data at the first remote memory utilizing a respective network interface controller (NIC) of the first remote processing node and of a second node involved with the RADM operation, wherein the first remote node and second node are identified by respective node IDs (NIDs) retrieved from the GRM, and wherein a physical move of the copy of the data occurs concurrent with other ongoing processing on the at least one processor.

2. The data processing system of claim 1, wherein:
the second node is a local processing node; and
when the data is being moved from the first remote node to the local processing node, the NIC of the local processing node receives the data from a remote NIC of the first remote node and places the data within a RA location of memory to which the destination EA of the RADM instruction is mapped, wherein the RADM operation moves a copy of data from the first remote node to the local processing node without direct processor or OS involvement at the local processing node.

3. The data processing system of claim 1, wherein:
the second node is a local processing node; and
when the data is being moved from the local processing node to the first remote node, the NIC of the local processing node retrieves the copy of the data directly from the RA mapped to the source EA of the RADM instruction and forwards the data towards a remote NIC of the first remote node, which remote NIC places the data within a RA location of first remote memory to which the destination EA of the RADM instruction is mapped, wherein the RADM operation moves a copy of data from the local processing node to the first remote node with little direct processor or OS involvement at the local processing node.

4. The data processing system of claim 3, wherein the NIC is a host fabric interface (HFI).

5. The data processing system of claim 1, wherein both the first remote node and the second node are remotely connected, via a network fabric to a local processing node.

6. The data processing system of claim 1, further comprising:
    a data center having the identifying information about the node-level EA-to-RA mappings for a parallel job with multiple tasks executing across multiple processing nodes, wherein the data center maintains task-distribution and address mapping information generated during initialization of the parallel job by the GRM;
    wherein the RADM Mover accesses the data center to retrieve the identifying information during said retrieving.

7. The data processing system of claim 1, further comprising:
    processing logic for recognizing the RADM instruction/request within an instruction set architecture, which RADM instructions initiate a remote asynchronous data move operation, said RADM instruction including a source effective address (EA) and a destination effective address for the RADM operation, wherein said processor retrieves the source EA and the destination EA from the RADM instruction and places the addresses within one or more registers of the RADM Mover;
    wherein the asynchronous data mover includes one or more registers for holding the source effective address (EA) and the destination EA of the RADM operation.

8. The data processing system of claim 7, wherein:
the RADM instruction comprises a set of fields, including a first field with the source EA, a second field with the destination EA, and a third field indicating a move operation to be performed on the data at the source EA; and
the RADM Mover processes information from a received RADM instruction to provide a fourth field with node identifying information, indicating a physical or network location of one or more processing nodes with memory storage locations having RAs to which the source EA and destination EA are mapped; and wherein the asynchronous data mover forwards the information from the RADM instruction along with the fourth field to the network interface controller (NIC), which forwards an RADM operation request to NICs of a corresponding source processing node and a corresponding destination processing node for completion of the RADM operation.

9. In a data processing system having at least one processor which executes processes of a first task of multiple tasks within a parallel job, including at least one second task executing on a first remote processing node and a memory communicatively coupled to the at least one processor and having a plurality of physical storage locations having associated real addresses (RAs) for storing data, wherein one or more effective addresses of a process of the first task executing on the at least one processor is mapped to a RA of at least one physical storage location in a first remote memory of the first remote processing node, a method comprising:

receiving information related to a remote asynchronous data move (RADM) instruction/request received for execution at the processor, which execution moves data to/from a first effective address (EA) that is memory mapped to a RA of a physical storage location in the remote memory; and in response to being triggered by the processor following the processor receipt of the RADM instruction/request, initiate a remote asynchronous data move (RADM) operation that moves a copy of the data from/to the first remote memory by:

(a) retrieving from a global resource manager (GRM) identifying information indicating which remote processing node among multiple remote processing nodes has the first remote memory in which the EA of the RADM instruction is mapped to a RA;

(b) completing a user-level virtual move of data at the at least one processor by utilizing a source EA and a destination EA within the RADM instruction; and (c) triggering a completion of a physical move of the data at the first remote memory utilizing a respective network interface controller (NIC) of the first remote processing node and a second node involved with the RADM operation, wherein the first remote node and second node are identified by respective node IDs (NIDs) retrieved from the GRM, and wherein a physical move of the copy of the data occurs concurrent with other ongoing processing on the at least one processor.

10. The method of claim 9, wherein the second node is a local processing node, and the method further comprises:

when the data is being moved from the first remote node to the local processing node, the NIC of the local processing node receiving the data from a remote NIC of the first remote node and places the data within a RA location of memory to which the destination EA of the RADM instruction is mapped, wherein the RADM operation moves a copy of data from the first remote node to the local processing node without direct processor or OS involvement at the local processing node; and when the data is being moved from the local processing node to the first remote node, the NIC of the local processing node retrieving the copy of the data directly from the RA mapped to the source EA of the RADM instruction and forwards the data towards a remote NIC of the first remote node, which remote NIC places the data within a RA location of first remote memory to which the destination EA of the RADM instruction is mapped, wherein the RADM operation moves a copy of data from the local processing node to the first remote node with little direct processor or OS involvement at the local processing node.

11. The method of claim 10, wherein the NIC is a host fabric interface (HFI).

12. The method of claim 9, wherein both the first remote node and the second node are remotely connected, via a network fabric to a local processing node.

13. The method of claim 9, further comprising:

the RADM Mover accessing a data center to retrieve the identifying information during said retrieving, wherein the data center includes the identifying information about the node-level EA-to-RA mappings for a parallel job with multiple tasks executing across multiple processing nodes, wherein the data center maintains task-distribution and address mapping information generated during initialization of the parallel job by the GRM.

14. The method of claim 9, further comprising:

recognizing the RADM instruction/request within an instruction set architecture, which RADM instructions initiate a remote asynchronous data move operation, said RADM instruction including a source effective address (EA) and a destination effective address for the RADM operation; and said processor retrieving the source EA and the destination EA from the RADM instruction and placing the addresses within one or more registers of the RADM Mover;

wherein the asynchronous data mover includes one or more registers for holding the source effective address (EA) and the destination EA of the RADM operation.

15. The method of claim 14, wherein the RADM instruction comprises a set of fields, including a first field with the source EA, a second field with the destination EA, and a third field indicating a move operation to be performed on the data at the source EA, and the method further comprising:

the RADM Mover processing information from a received RADM instruction to provide a fourth field with node identifying information, indicating a physical or network location of one or more processing nodes with memory storage locations having RAs to which the source EA and destination EA are mapped; and the RADM Mover forwarding the information from the RADM instruction along with the fourth field to the NIC, which forwards an RADM operation request to NICs of a corresponding source processing node and a corresponding destination processing node for completion of the RADM operation.

16. An article of manufacture embodied as a computer program product with program code configured for execution within a data processing system having at least one processor which executes processes of a first task of multiple tasks within a parallel job, including at least one second task executing on a first remote processing node and a memory communicatively coupled to the at least one processor and having a plurality of physical storage locations having associated real addresses (RAs) for storing data, wherein one or more effective addresses of a process of the first task executing on the at least one processor is mapped to a RA of at least one physical storage location in a first remote memory of the first remote processing node, the program code comprising code for:

receiving at a remote asynchronous data mover (RADM Mover) associated with the at least one processor, information related to a remote asynchronous data move (RADM) instruction/request that was received for processing by the processor, which RADM instruction/request triggers a move of data to/from a first effective address (EA) that is memory mapped to a RA of a physical storage location in the remote memory; and initiate a remote asynchronous data move (RADM) operation that moves a copy of the data from/to the first remote memory by:

(a) retrieving from a global resource manager (GRM) identifying information indicating which remote processing node among multiple remote processing nodes has the first remote memory in which the EA of the RADM instruction is mapped to a RA;

(b) completing a user-level virtual move of data at the at least one processor by utilizing a source EA and a destination EA within the RADM instruction; and (c) triggering a completion of a physical move of the data at the first remote memory utilizing a respective network interface controller (NIC) of the first remote processing node and of a second node involved with the RADM operation, wherein the first remote node and second node are identified by respective node IDs (NIDs) retrieved from the GRM, and wherein a physical move of the copy of the data occurs concurrent with other ongoing processing on the at least one processor.

17. The article of manufacture of claim 16, wherein the second node is a local processing node, and the program code further comprises code for:

when the data is being moved from the first remote node to the local processing node, the NIC of the local processing node receiving the data from a remote NIC of the first remote node and places the data within a RA location of memory to which the destination EA of the RADM instruction is mapped, wherein the RADM operation moves a copy of data from the first remote node to the local processing node without direct processor or OS involvement at the local processing node; and when the data is being moved from the local processing node to the first remote node, the NIC of the local processing node retrieving the copy of the data directly from the RA mapped to the source EA of the RADM instruction and forwards the data towards a remote NIC of the first remote node, which remote NIC places the data within a RA location of first remote memory to which the destination EA of the RADM instruction is mapped, wherein the RADM operation moves a copy of data from the local processing node to the first remote node with little direct processor or OS involvement at the local processing node.

18. The article of manufacture of claim 16, wherein the NIC is a host fabric interface (HFI) and wherein both the first remote node and the second node are remotely connected, via a network fabric to a local processing node.

19. The article of manufacture of claim 16, further comprising program code for:

the RADM Mover accessing a data center to retrieve the identifying information during said retrieving, wherein the data center includes the identifying information about the node-level EA-to-RA mappings for a parallel job with multiple tasks executing across multiple processing nodes, wherein the data center maintains task-distribution and address mapping information generated during initialization of the parallel job by the GRM.

20. The article of manufacture of claim 16, further comprising program code for:

recognizing the RADM instruction/request within an instruction set architecture, which RADM instructions initiate a remote asynchronous data move operation, said RADM instruction including a source effective address (EA) and a destination effective address for the RADM operation;

said processor retrieving the source EA and the destination EA from the RADM instruction and placing the addresses within one or more registers of the RADM Mover;

wherein the asynchronous data mover includes one or more registers for holding the source effective address (EA) and the destination EA of the RADM operation;

wherein the RADM instruction comprises a set of fields, including a first field with the source EA, a second field with the destination EA, and a third field indicating a move operation to be performed on the data at the source EA, and the program code further comprising code for:

the RADM Mover processing information from a received RADM instruction to provide a fourth field with node identifying information, indicating a physical or network location of one or more processing nodes with memory storage locations having RAs to which the source EA and destination EA are mapped; and the RADM Mover forwarding the information from the RADM instruction along with the fourth field to the NIC, which forwards an RADM operation request to NICs of a corresponding source processing node and a corresponding destination processing node for completion of the RADM operation.

* * * * *